United States Patent

Yurkoski et al.

[15] 3,687,087
[45] Aug. 29, 1972

[54] INSULATING STRUCTURE FOR INTERIOR OF RAILWAY FREIGHT CARS

[72] Inventors: Frank R. Yurkoski, Bridgeton; Edward L. Coyle, St. Charles; Robert F. Needham, St. Charles; Dallas W. Rollins, St. Charles, all of Mo.

[73] Assignee: ACF Industries, Incorporated, New York, N.Y.

[22] Filed: April 13, 1970

[21] Appl. No.: 27,612

[52] U.S. Cl. ............... 105/355, 105/358, 105/406, 105/423, 220/10, 264/45, 280/5, 296/31 P
[51] Int. Cl. ............................................. B61d 27/00
[58] Field of Search ...... 105/358, 360, 404, 406, 423, 105/355; 220/10, 9 F; 29/455; 161/39; 264/45; 280/5; 296/31 P; 260/29.2

[56]  References Cited

UNITED STATES PATENTS 3,547,047  12/1970   Needham ................. 105/360
3,338,185   8/1967   Phillips ..................... 105/358

Primary Examiner—Arthur L. La Point
Assistant Examiner—Richard A. Bertsch
Attorney—Eugene N. Riddle

[57]  ABSTRACT

A resilient insulating structure on the interior surface of a railway freight car body in contact with lading carried by the car and supporting at least a substantial portion of the lading carried by the car. The resilient insulating structure comprises a layer of polyurethane foam material having its outer surface secured to the inner surface of the metallic car body and an elastomeric inner liner secured to the inner surface of the polyurethane foam material. The polyurethane foam material forms an intermediate cushioning layer for the elastomeric inner liner and is of a thickness at least around 1 inch and may be as great as around 8 inches. The elastomeric inner liner is less than around ½ inch thickness and has a stiffness less than the stiffness of the foam material. Some of the energy created by forces exerted by the lading against the resilient insulating structure is dissipated by the deformation of the insulating structure with the remainder of the energy being transmitted to the railway car body through the insulating structure. Upon unusually high local stresses being exerted, such as from a tool or a workman within a car, the intermediate foam layer may be deformed permanently while the elastomeric inner liner in contact with the lading remains undamaged.

9 Claims, 12 Drawing Figures

PATENTED AUG 29 1972

INVENTORS.
FRANK R. YURKOSKI
EDWARD L. COYLE
ROBERT F. NEEDHAM
DALLAS W. ROLLINS
BY Eugene N. Riddle
ATTORNEY

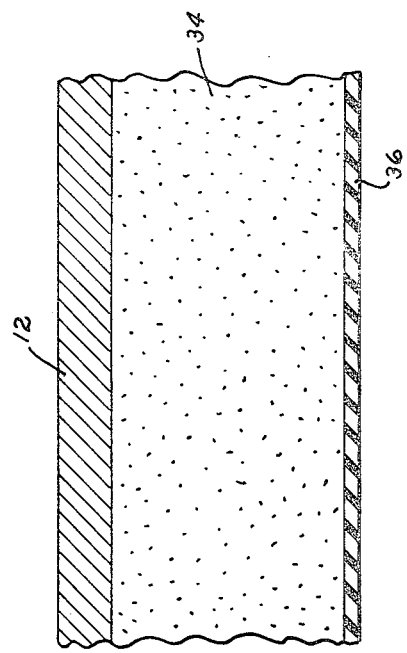
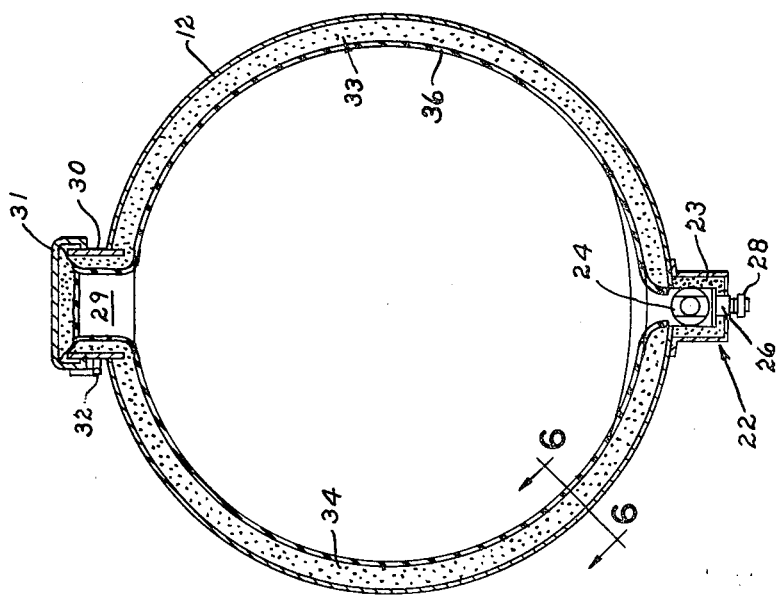

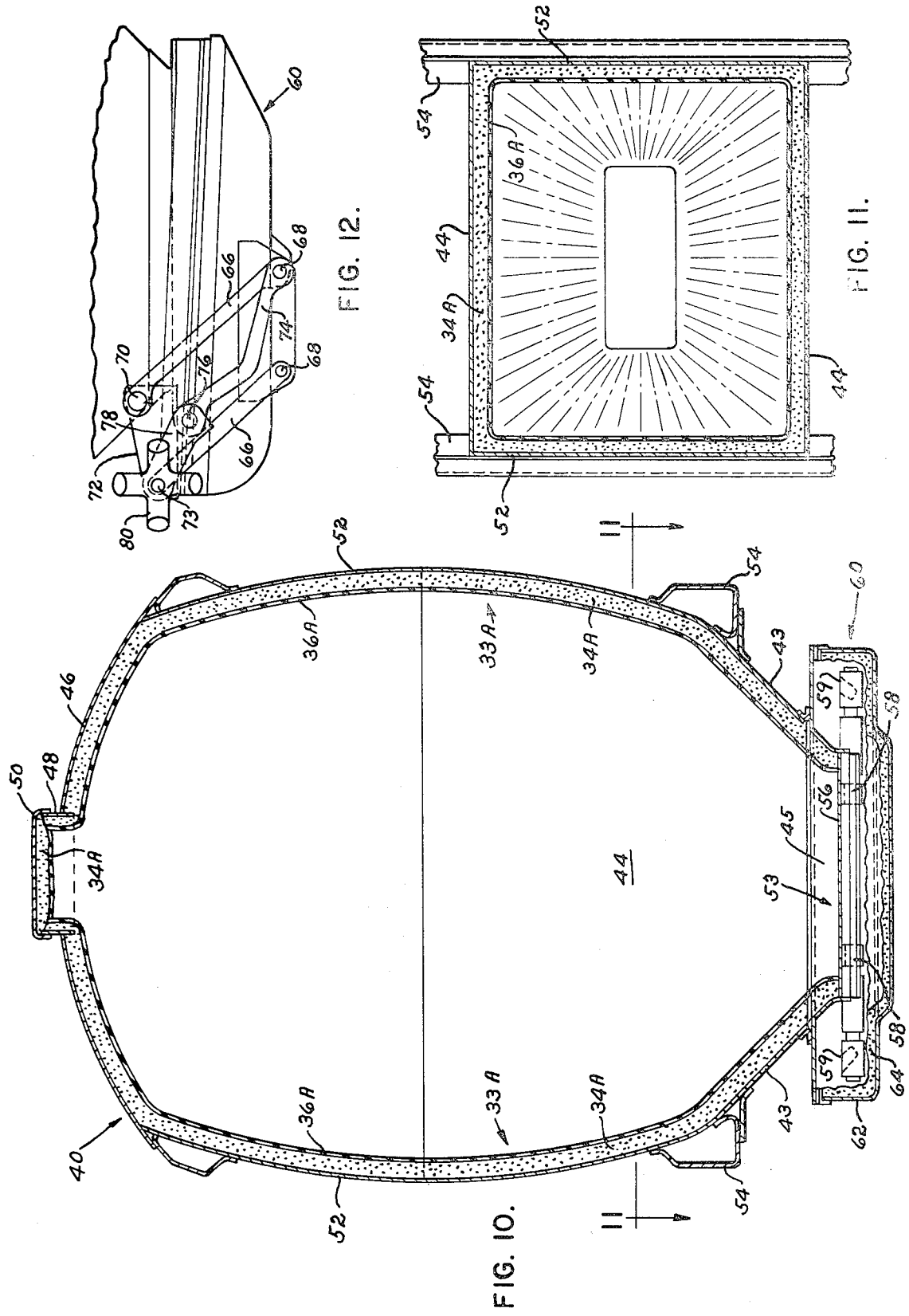

INSULATING STRUCTURE FOR INTERIOR OF RAILWAY FREIGHT CARS

BACKGROUND OF THE INVENTION

Railway freight cars have been insulated heretofore with polyurethane foam materials. For example, U.S. Pat. 3,313,020 dated Apr. 11, 1967 discloses a tank car with polyurethane insulating material between an inner metal tank and an outer metal tank. Further, polyurethane foam material has been sprayed heretofore on the exterior of railway freight cars, such as covered hopper cars.

In addition, protective coatings have been applied heretofore directly to the inner metal surfaces of tank cars and hopper cars to protect the metal surfaces from such elements as corrosion, or abrasion from the lading carried by the car. Also, certain ladings, such as foodstuffs, and certain chemicals, require that direct contact between the metallic surface and the ladings be prevented. These protective coatings have oftentimes been subjected to mechanical damage, such as being scratched by tools or workmen within the car.

DESCRIPTION OF THE INVENTION

The present invention comprises a resilient, load carrying, insulating structure secured to the interior surface of a railway freight car body in contact with and supporting at least a portion of the lading carried within the car. The insulating structure comprises an outer layer of insulating foam material, such as a polyurethane rigid foam material, secured to the inner surface of the metallic body and being of a thickness at least around one inch, and an elastomeric inner liner secured to the inner surface of the polyurethane foam material. The layer of polyurethane foam material forms an intermediate layer between the elastomeric inner liner and the metallic outer shell which acts as a cushion for the inner liner. Upon the inner liner being contacted by tools or perhaps workmen within a car, the inner liner "stretches" and is depressed outwardly to crush or compress adjacent hollow cells of the polyurethane foam layer. While the polyurethane intermediate layer may remain permanently deformed, the elastomeric inner liner is normally not damaged as the inner elastomeric liner is cushioned by the deformation of the intermediate layer. The elastomeric inner liner is of a thickness less than around ½ inch and has a generally smooth and abrasion resistant inner surface in contact with the lading. The tensile modulus of elasticity of the polyurethane foam material forming the intermediate layer is generally in the range between about 500 psi and 4000 psi while the stiffness of the elastomeric liner is no less than the stiffness of the polyurethane foam material. Thus, some of the forces exerted by the lading against the resilient insulating structure are dissipated by the deformation of the resilient insulating structure and the remainder of the forces are transmitted to the metallic body.

The invention accordingly comprises the constructions hereinafter described, the scope of the invention being indicated in the following claims.

In the accompanying drawings, in which two of various possible embodiments of the invention are illustrated, FIG. 1 is a side elevation of one embodiment comprising a railway tank car having the insulating structure comprising the present invention on the interior of the tank shell;

FIG. 3 is a transverse section taken generally along line 3—3 of FIG. 1;

FIG. 6 is an enlarged partial section taken generally along line 6—6 of FIG. 3;

FIG. 10 is a section taken generally along line 10—10 of FIG. 9;

FIG. 11 is a section taken generally along line 11—11 of FIG. 10; and

FIG. 12 is a partial side elevation of the lower cover and means for moving the cover between open and closed positions.

Corresponding reference characters indicate corresponding parts throughout the several views of the drawings.

Figure 1:
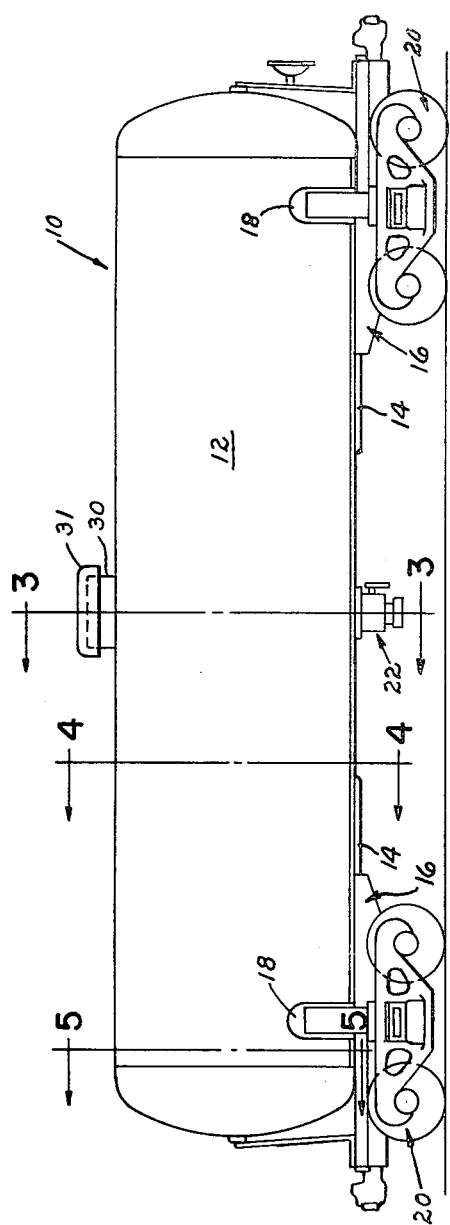
Figure 2:
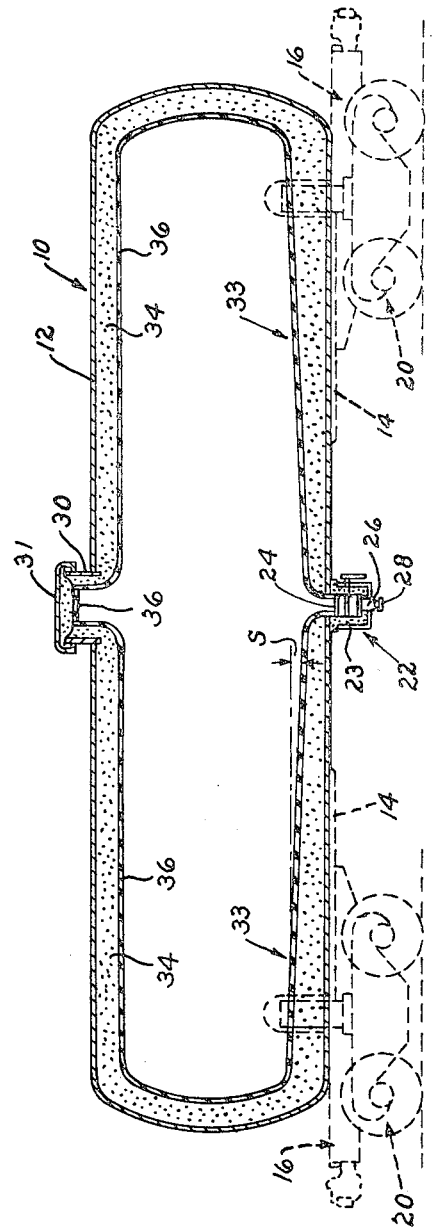
FIG. 2 is a longitudinal section of the railway tank car shown in FIG. 1.
Figure 5:
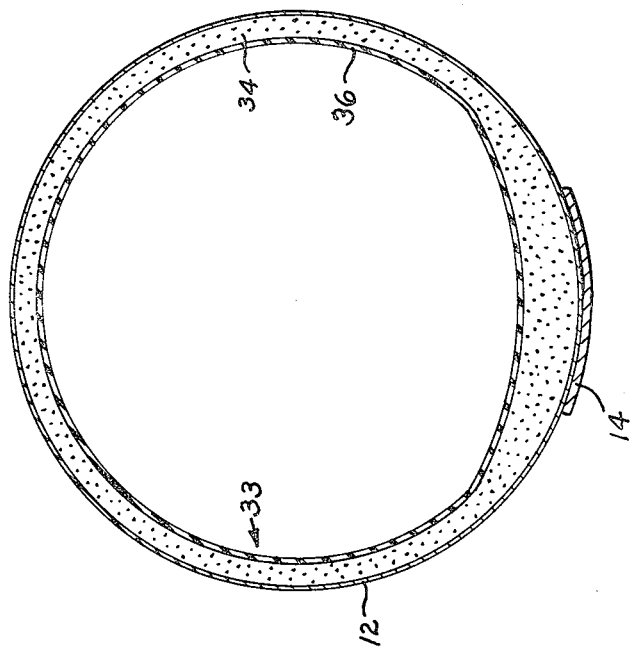
FIG. 5 is a transverse section taken generally along line 5—5 of FIG. 1.
Figure 4:
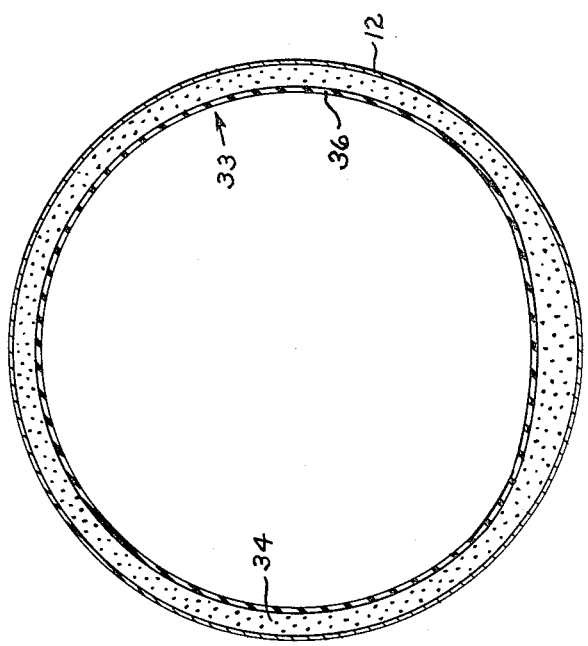
FIG. 4 is a transverse section taken generally along line 4—4 of FIG. 1.
Figure 8:
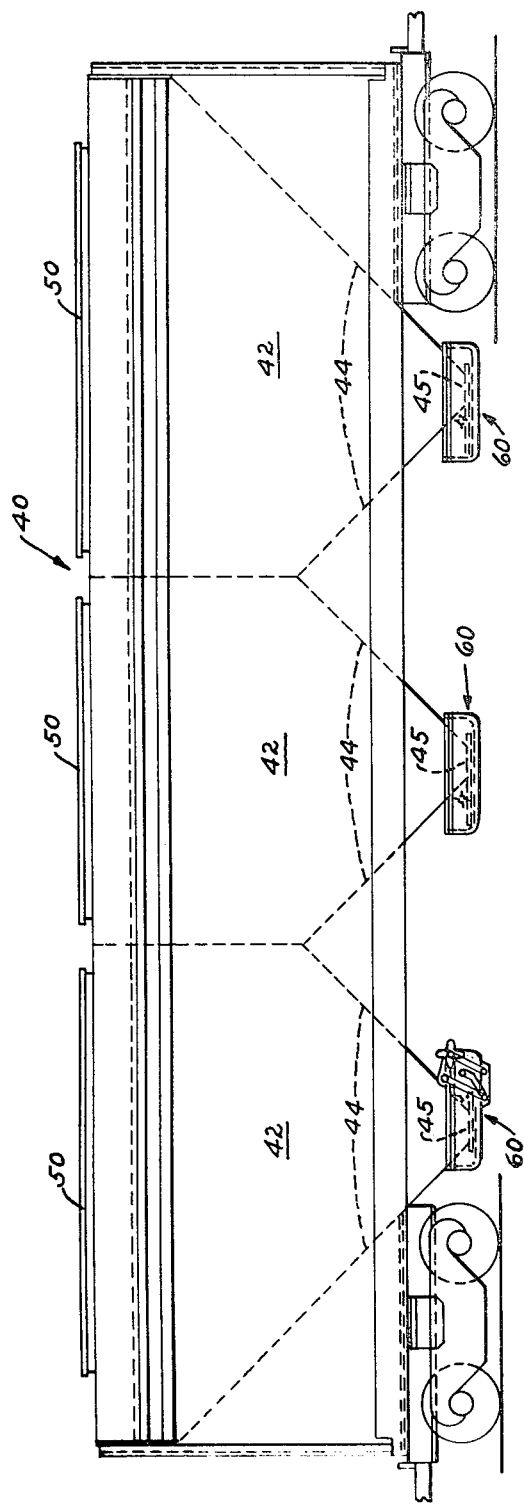
FIG. 8 is a side elevation of another embodiment comprising a covered hopper railway car having the insulating structure comprising the present invention on the interior of the car.

Referring now to the drawings for a better understanding of this invention a railway tank car generally indicated 10 illustrates an embodiment of a railway freight car to which the present invention is adapted. Outer metallic tank shell 12 of car 10 has a saddle plate 14 secured to its bottom adjacent each end thereof, and a stub center sill structure generally indicated 16 is mounted adjacent each end of the car to the superjacent saddle plate 14. A cradle pad 18 is secured to tank shell 12 adjacent each end thereof and a wheeled truck generally indicated 20 beneath each cradle pad 18 supports tank car 10 on a railway track.

Tank car 10 is adapted primarily for the transport of liquid ladings. To discharge liquids from tank shell 12, a bottom outlet generally indicated 22 is provided having an outer insulated housing 23 enclosing a manually operated valve 24 mounted within discharge pipe 26 to control the flow of liquid from the tank car. A lower removable cap 28 is mounted on the lower end of pipe 26. For loading tank car 10, an inlet 29 is defined by a ring 30. An outer insulated cover 31 is mounted for pivotal movement over ring 30 about pivot 32.

The interior insulating structure generally indicated 33 comprising the present invention is particularly adapted to be employed when it is desired to maintain a predetermined temperature range within the interior of the railway freight car such as necessary for the transport of certain commodities or ladings. The insulating structure includes an outer insulating layer 34 of a polyurethane foam material secured to interior surface of tank shell 12, and an elastomeric outer liner 36 secured to the interior surface of the polyurethane layer 34 and in contact with the lading transported by railway car 10.

In applying the insulating structure to the interior surface of metallic tank shell 12, a suitable primer, such as zinc chromate or a vinyl wash-coat, is applied to the inner metallic surface after the metallic surface has been cleaned by sand or pellets. The primer is sprayed on the inner surface of tank shell 12 at a dry film thickness between around 0.0003 inches and 0.003 inches. After the primer has cured, which normally is within a relatively short period of time, such as 1 hour, the polyurethane foam insulating material is sprayed onto the interior of tank shell 12 by a suitable spray foam system. The insulation materials are formulated as a two-component one-shot master batch or prepolymer system utilizing polymethylene, polyphenylisocyanate and/or diphenylmethane diisocyanate in conjunction with a suitable polyhydroxyl resin, fluorocarbon blowing agent and necessary catalysts, surfactants, stabilizers and flame retardants to produce when properly blended a cellular polyurethane spray foam system. The foam material expands inwardly and as the expanded foam material cures and hardens, it adheres firmly to the interior surface of tank shell 12. It will be understood that other insulating foam materials known to the art may also be used in the practice of the invention. For example, urea-formaldehyde foam systems and phenolic foam systems may be employed.

Liner 36 is then sprayed onto the inner surface of the polyurethane foam layer 34. Liner 36 is an elastomer, such as a urethane elastomer of polyurethane diisocyanate in which a urethane polyol based elastomeric coating comprises two components including a curative and a surfactant. The thickness of liner 36 is between 10 mils (0.01 inch) and 100 mils (0.100 inch). A hard, tough, smooth inner surface is thereby provided in contact with lading to be transported by railway car 10. It will be understood that other similar elastomers known to the art may also be used in carrying out the invention. For example, a polyvinyl chloride elastomeric liner, a chlorinated rubber liner, or an epoxy liner may be employed.

In tank cars, the liquid lading must flow to bottom outlet 22 and for this purpose, the floor or bottom of railway car 10 formed by insulating structure 33 leads to outlet 22 and has a constantly decreasing thickness from the ends thereof of a slope S of ¼ inch for each foot of length. Outer shell 12 is of a uniform diameter for its entire length. The slope is provided in the layer 34 when sprayed on the interior surface of the bottom of shell 12.

Density, expressed in pounds per cubic foot ( pcf) is an important property of foam layer 34 and will affect the stiffness of layer 34. Densities between one pcf and eight pcf will function adequately.

Metallic tank steel thickness may vary from around ¼ inch to ¾ inch. The polyurethane layer 34 should have a minimum thickness of around one inch and may increase in thickness up to around 8 or 9 inches depending on the lading and temperature requirement. Liner 36 should have a thickness between around 0.010 inch and 0.100 inch.

Polyurethane foam layer 34 hardens when cured but yet has a slight resilience. The compressive modulus of elasticity, which is the ratio of the unit stress to the corresponding unit deformation in pounds per square inch (psi) may range between 500 and 2000. Foam layer 34 has a stiffness greater than the stiffness of liner 36. Forces from the lading which include the lading weight and the back-and-forth liquid lading flow or "sloshing" are first transmitted to liner 36. The elastomer liner 36 tends to deform but this tendency is resisted by the greater stiffness in the adjacent foam material 34. Therefore, the deformation is limited by the stiffness of foam layer 34 but any deformation tends to dissipate a portion of the total forces exerted on liner 36 from the lading. This is particularly important in regard to gas pressure sometimes generated by the liquid lading. The resilience and deformation of the insulating material will tend to absorb at least a portion of such gas pressures. The remainder of the forces are transmitted by foam layer 34 to the outer metal shell 12 and exerts tensile stresses thereon.

For an elastomeric material, the stress-strain curve is not reliable especially for strains over about 15 percent as the curve is nonlinear thereafter and the "modulus of elasticity" employed for metals is not normally employed for an elastomer. However, a modulus or tensile load in pounds per square inch (psi) is normally employed for an elastomer at a stated elongation such as a 300 percent elongation. A tensile strength of between around 500 psi and 4000 psi for a 300 percent elongation is suitable for liner 36.

While liner 36 is preferably of a thickness less than ¼ inch, in some instances it may be desirable, at least in some portions of a railway freight car, to have a greater thickness, such as an area employed as a walkway within a car. In these instances, a thickness as high as around ½ inch may be desirable for liner 36. Further, the thickness of the insulating foam material may vary in different areas of the railway freight car. For example, it may be desirable to increase the thickness of the foam material in the roof areas as the solar heat load is higher in the roof areas.

A relationship exists between the compressive modulus of elasticity of the intermediate polyurethane foam material and the tensile modulus of elasticity of the inner elastomeric liner. It is necessary that the intermediate foam material fail in compression before the inner liner fails in tension. The pressure within a railway tank car or covered hopper car may be a critical loading for design purposes. This pressure might be provided by the dead weight of the lading, the surge pressure of the lading from impact, or internal fluid pressure. In order to determine the minimum elongation of the elastomeric liner which is required in order for the polyurethane rigid foam material to fail in compression before the liner fails in tension, the following may be employed.

$e_f = pt/rE$ $p =$ pressure within container in pounds per square inch.

$E =$ compressive modulus of elasticity of the foam in psi.

$e_{ff} =$ elastic limit of foam in compression in inches per inch.

$e_f =$ compressive strain in inches per inch for the polyurethane closed cell foam.

$e_1 =$ minimum elastic tensile elongation required for the liner in inches per inch.

$e =$ elastic tensile elongation for the liner in inches per inch.

$r =$ minimum radius of foam and liner in inches.

$t$ = thickness of foam in inches.

A typical foam curve showing the stress-strain relationship of a polyurethane closed cell foam in compression is:

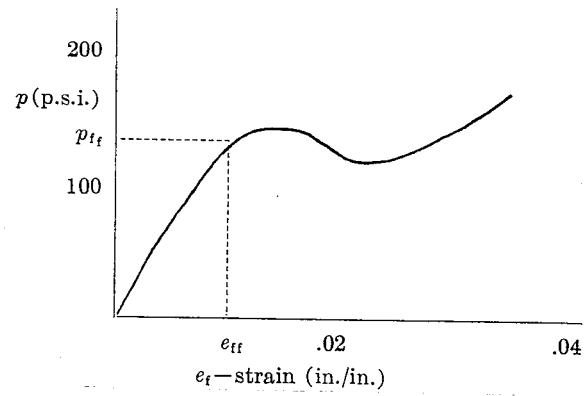

$e_{tf}$ is the elastic limit of the foam in compression and is one point on the stress-strain curve. Likewise, $p_{ff}$ is one point on the curve and must be equal to or greater than the maximum pressure $p$ inside the car.

Assuming that $p$ is equal to $p_{ff}$ as indicated at one point on the curve then the minimum elongation $e_1$ of the liner required in order for the foam to fail in compression may be found by the formula $$e_1 = t \, p_{ff}/rE$$

For example, if $p_{ff}$ = 100 psi, $t$ = 3 inches, $r$ = 50 inches, and $E$ = 300 psi where $t$ is thickness of the foam, $r$ is the radius of a tank or container, and $E$ is the compressive modulus of elasticity of the foam, then $$e_1 = \frac{(100)}{(50)} \frac{(3)}{(300)} = .02 \text{ or } 2\% \text{ which is the minimum elongation of the liner required in order for the foam to fail in compression first.}$$

Thus, the liner should have an elongation greater than 2 percent as it is desired that the foam layer may be depressed as much as one inch before the liner would fail.

The polyurethane foam material and liner should not have any sharp corners but should have an arcuate radius of certain minimum dimensions in order for the foam layer to fail before the liner. The following formula has been found to be satisfactory in determining the minimum radius: $r > \dfrac{e_{tf} \, t}{e_1}$ where $t$ = thickness of foam in inches
$r$ = minimum radius of foam and also the liner
$e_{ff}$ = elastic limit of foam in compression
$e_1$ = minimum elastic elongation required for the liner In the event the radius has been determined and it is desired to select a suitable liner and a suitable polyurethane foam material (i.e. a foam material which fails in compression before the elastomeric inner liner fails in tension), then the following formula should be applied:

$$e_1 > \frac{e_{tf} \, t}{r}$$

Figure 7:
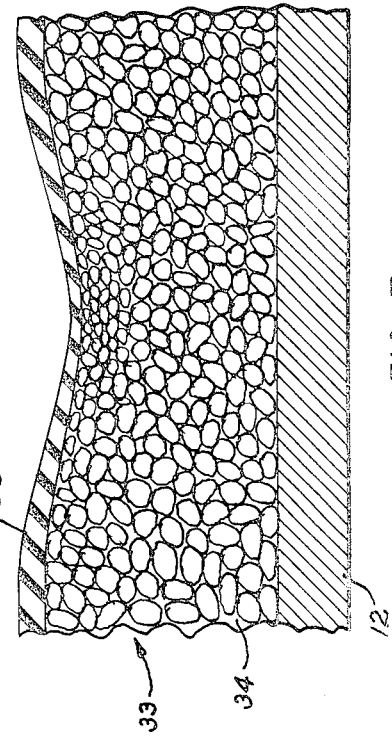
FIG. 7 is an enlarged section similar to FIG. 6 but showing the polyurethane foam material deformed.
Figure 9:
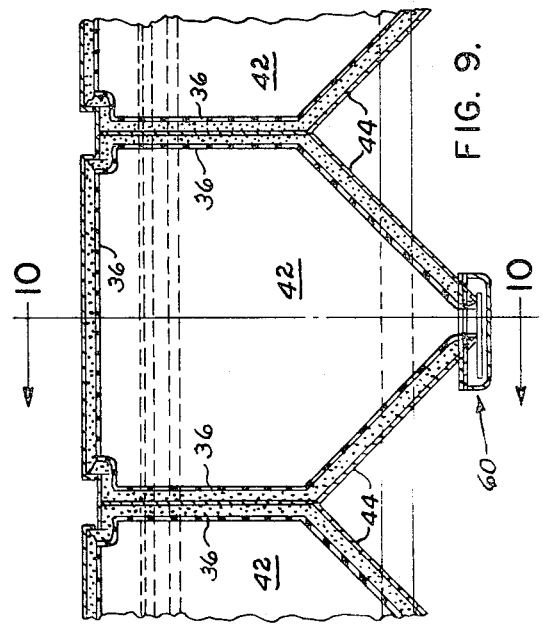
FIG. 9 is a section of one hopper illustrating the insulating material on the interior of the hopper.

The above formulas are applicable when desired that the elastomeric liner not fail in tension before the foam fails in compression and merely define minimum limits. A safety factor of around four should be employed for best results. As shown in FIG. 7, the rigid polyurethane foam layer 34 has been crushed or permanently deformed under compressive forces while elastomeric liner 36 stretches and remains undamaged.

Referring to FIGS. 8-12, another embodiment is illustrated comprising insulation on the interior of a covered hopper railway car generally indicated 40. Railway car 40 includes a plurality of hoppers 42 each having opposed side slope sheets 43 and opposed end slope sheets 44 leading to a bottom discharge opening indicated 45 for the discharge of lading from the associated hopper 42. A roof 46 has a hatch fitting 48 thereon and hatch cover 50 is mounted on fitting 48 for movement between open and closed positions for loading hoppers 42. Side sheets 52 form the sides of car 40 and side sills 54 extend the length of car 40 along the lower marginal portions of side sheets 52.

A bottom discharge structure generally indicated 53 forms a closure for discharge opening 45 and includes a gravity gate 56 having a suitable rack and pinion drive 58. A capstan 59 on an operating shaft is rotated for opening and closing gate 56. To insulate gate 56, an outer cover generally designated 60 fits about gate 56. Cover 60 comprises an outer "Fiberglas" body 62 and a polyurethane foam layer 64 on the interior of body 62. A pair of links 66 pivoted at 68 to cover 60 and at 70 to a bracket 72 on car 40 form a parallelogram linkage supporting cover 60. An operating shaft 73 forms one of the pivots 70 and has an arm 74 fixed thereto. Arm 74 is connected at pivot 76 to an overcenter link 78 which is pivoted adjacent its lower end about pivot 68. A capstan 80 may be actuated for rotating shaft 73 and moving link 78 to an overcenter position with respect to adjacent pivots 68 and 70 thereby permitting cover 60 to swing to an open position. For further details of cover 60, reference is made to copending application Ser. No. 810,197 filed Mar. 25, 1969 and entitled "Lower Cover for a Bottom Discharge Outlet of a Railway Hopper Car", the entire disclosure of which is incorporated by this reference.

Insulating structure 33A applied to the interior of railway car 40 is generally identical to insulating structure 33 of the embodiment shown in FIGS. 1-7 and include a polyurethane foam layer 34A and an elastomeric inner liner 36A. As elastomeric inner liner 36A is of a relatively small thickness, such as between 10 mils and 100 mils, the surface of the polyurethane foam layer 34A must be relatively smooth or an undesirable unevenness might occur on the exposed liner surface. Especially at the corners formed at the juncture of slope sheets 43 and 44, the polyurethane foam material 34A should be sprayed so that no sharp corners are provided. At times, it may be desirable to spray a second coat of polyurethane foam in the corners or other areas where it is difficult to obtain relatively smooth surfaces.

The slope of side sheets 52 may be changed slightly by varying the thickness of the foam insulation thereon to improve the discharge characteristics for a specific lading. Further, the thickness of the foam insulation at the intersections of the slope sheets 43, 44 may be varied to eliminate the tendency of some ladings to hang up at these intersections, and any uneven joints at the intersections will be covered with the foam material.

What is claimed is:

1. In a railway freight car having an outer metallic body, a resilient heat insulating structure on the interior surface of the metallic body in contact with lading within the car, said insulating structure being a load bearing structure supporting at least a substantial portion of the lading within the body and subjected to forces therefrom which are transferred from the lading to the outer metallic body, said insulating structure comprising a layer of insulating foam material having its outer surface secured to the inner surface of the metallic body and a smooth, abrasion resistant elastomeric liner secured to the inner surface of the foam material, the insulating foam material being of a thickness greater than said liner and having a stiffness greater than the elastomeric liner whereby some of the forces exerted by the lading against the resilient insulating structure are dissipated by the deformation of the insulating structure.

2. In a railway freight car having an outer metallic body, a resilient heat insulating structure on the interior surface of the metallic body in contact with lading within the car, said insulating structure being a load bearing structure supporting at least a substantial portion of the lading within the body and subjected to forces therefrom which are transferred from the lading to the outer metallic body, said insulating structure comprising a layer of insulating foam material having its outer surface secured to the inner surface of the metallic body and being of a thickness at least around one inch, and an elastomeric liner secured to the inner surface of the insulating foam material, said liner being of a thickness less than around ½ inch and having a generally smooth and abrasion resistant inner surface in direct contact with the lading, the compressive modulus of elasticity of said foam material being generally in the range between about 500 psi and 2000 psi and of a stiffness greater than the elastomeric liner whereby some of the forces exerted by the lading against the resilient insulating structure are dissipated by the deformation of the resilient insulating structure and the remainder are transferred to the metallic body.

3. In a railway tank car having an outer cylindrical metallic shell, and a discharge opening in the bottom of the outer shell intermediate its length; the improvement comprising a resilient heat insulating structure on the interior surface of the metallic shell adapted for contact with liquid lading within the car, the insulating structure on the bottom of the outer shell tapering from the ends of the cylindrical shell to the discharge opening to provide a sloping bottom surface for facilitating the flow of liquid lading to the discharge opening, said insulating structure comprising a layer of insulating foam material having its outer surface secured to the inner surface of the metallic body and of a thickness of at least one inch, and an elastomeric liner secured to the inner surface of the foam material, said inner liner being of a thickness less than around ½ inch and having a generally smooth and abrasion resistant inner surface in direct contact with the lading, said insulating foam material being of a stiffness greater than the stiffness of the elastomeric liner whereby some of the forces exerted by the lading against the resilient insulating structure are dissipated by the deformation of the resilient insulating structure.

4. In a railway tank car having an outer cylindrical metallic shell, and a discharge opening in the bottom of the outer shell intermediate its length; the improvement comprising a resilient heat insulating structure on the interior surface of the metallic shell adapted for contact with liquid lading within the car, the insulating structure on the bottom of the outer shell tapering from the ends of the cylindrical shell to the discharge opening to provide a sloping bottom surface for the flow of liquid lading to the discharge opening, said insulating structure being a load bearing structure supporting at least a substantial portion of liquid lading within the body and subjected to forces therefrom which are transferred from the lading to the outer metallic body, said insulating structure comprising a layer of insulating foam material having its outer surface secured to the inner surface of the metallic shell and being of a thickness at least around 1 inch, and a resilient liner secured to the inner surface of the insulating foam material, said inner liner being of a thickness less than around ¼ inch and having a generally smooth and abrasion resistant inner surface in direct contact with the lading, the compressive modulus of elasticity of said foam material being generally in the range between about 500 psi and 2000 psi and of a stiffness greater than the resilient liner whereby some of the forces exerted by the lading against the resilient insulating structure are dissipated by the deformation of the resilient insulating structure and the remainder are transferred to the metallic shell.

5. In a railway tank car as set forth in claim 4, said insulating foam material comprising a polyurethane foam material and said inner liner comprising a urethane elastomer.

6. A covered hopper railway car comprising, a pair of side sheets, a roof between the upper marginal portions of the side sheets, a plurality of hoppers arranged between the side sheets, a bottom discharge structure for each hopper positioned below a bottom discharge opening to control the discharge of lading from the associated hopper, hopper slope sheets sloping downwardly to each bottom discharge opening, a resilient insulating structure on the interior surfaces defining the hoppers, said insulating structure comprising a layer of insulating foam material having its outer surface secured to the inner surfaces of the covered hopper car including the roof, sides, and hopper slope sheets, and an elastomeric liner secured to the inner surfaces of the foam material, said liner being of a thickness less than around ¼ inch and having a generally smooth and abrasion resistant inner surface adapted to be indirect contact with the lading carried by the car.

7. A covered hopper railway car as set forth in claim 6 wherein said insulating foam material comprises a polyurethane foam material and said elastomeric liner comprises a urethane elastomer.

8. In a covered hopper railway car having a plurality of hoppers and a bottom discharge structure for each hopper including means to control the flow of lading from the associated hopper; the improvement comprising a resilient insulating structure on the interior surface of the car, said insulating structure being a load bearing structure supporting at least a substantial portion of the lading within the car and subjected to forces from the lading which are transferred therefrom to the body of the railway car, said insulating structure comprising a layer of polyurethane foam material having its outer surface secured to the inner surfaces of the hoppers, and an elastomeric liner secured to the inner surface of the polyurethane foam material, said liner being of a thickness less than around ¼ inch and having a generally smooth and abrasion resistant inner surface in direct contact with the lading carried within the hoppers.

9. In a railway freight car having an outer metallic body, a resilient heat insulating structure on the interior surface of the metallic body in contact with lading within the car, said insulating structure being a load bearing structure supporting at least a substantial portion of the lading within the body and subjected to forces therefrom which are generally transferred from the lading to the outer metallic body, said insulating structure comprising a layer of insulating foam material having its outer surface secured to the inner surface of the metallic body and being of a thickness at least around 1 inch, and an elastomeric liner secured to the inner surface of the insulating foam material, said liner being of a thickness less than around ½ inch and having a generally smooth and abrasion resistant inner surface in direct contact with the lading, the compressive modulus of elasticity of said foam material being generally in the range between about 500 psi and 2000 psi and of a stiffness greater than the elastomeric liner whereby some of the forces exerted by the lading against the resilient insulating structure are dissipated by the deformation of the resilient insulating structure and the remainder are transferred to the metallic body; said elastomeric liner having a minimum elongation in inches per inch as determined by the formula $$e_1 = \frac{t}{rE} p_{ff}$$

where $e_l$ is the minimum elastic tensile elongation in inches per inch required for the liner, $p_{ff}$ is the maximum pressure within the container in pounds per square inch, t is the thickness of foam in inches, $r$ is the minimum radius of foam and liner in inches, and $E$ is the compressive modulus of elasticity of the foam in psi.

* * * * *